US005581303A

United States Patent [19]

Djabbari et al.

[11] Patent Number: 5,581,303

[45] Date of Patent: Dec. 3, 1996

[54] VIDEO TIMING SIGNAL GENERATION CIRCUIT

[75] Inventors: Ali Djabbari, Cupertino, Calif.; Douglas J. Gilbert, Davenport, Iowa

[73] Assignee: Radius Inc., Sunnyvale, Calif.

[21] Appl. No.: 374,134

[22] Filed: Jan. 18, 1995

[51] Int. Cl.$^{6}$ .......... H04N 5/06

[52] U.S. Cl. .......... 348/524; 348/521

[58] Field of Search .......... 348/500, 521, 348/522, 523, 524, 540, 546, 547, 548; 345/22, 24, 27, 213; H04N 5/04, 9/44, 5/06, 9/45

[56] References Cited

U.S. PATENT DOCUMENTS

| | | | |
|---|---|---|---|
| 4,386,368 | 5/1983 | Banks | 358/150 |
| 4,567,521 | 1/1986 | de la Guardia et al. | 358/150 |
| 4,670,782 | 6/1987 | Harshbarger et al. | 358/139 |
| 4,739,403 | 4/1988 | Mark | 348/521 |
| 4,958,227 | 9/1990 | Wan | 348/523 |
| 5,014,128 | 5/1991 | Chen | 348/500 |
| 5,210,836 | 5/1993 | Childers et al. | 395/375 |
| 5,227,881 | 7/1993 | Wess et al. | 348/512 |
| 5,339,160 | 8/1994 | Shindou | 348/571 |
| 5,394,171 | 2/1995 | Rabii | 348/500 |

OTHER PUBLICATIONS

Gerry Kane, "CRT Controller Handbook", 1980 Osborne/McGraw Hill, pp. 4–1 to 4–40.

*Primary Examiner*—John K. Peng
*Assistant Examiner*—Chris Grant
*Attorney, Agent, or Firm*—Limbach & Limbach L.L.P.

[57] ABSTRACT

A programmable CPU running at a video display rate, or a sub-multiple thereof, is used to generate the timings by loading control registers on the fly. In a preferred embodiment, a very reduced instruction set is used to generate VSYNC, HSYNC, and CSYNC signals. The CPU executes instructions out of an Instruction SRAM. The CPU's main goal is to load a pair of backing registers before a down counter reaches the value of zero.

7 Claims, 1 Drawing Sheet

VIDEO TIMING SIGNAL GENERATION CIRCUIT

FIELD OF THE INVENTION

The present invention relates to timing circuits, particularly those used in conjunction with a video monitor.

BACKGROUND OF THE INVENTION

Timing circuits have been used in the prior art to control timing during video signal display and processing. These timing circuits are usually implemented in hardware. Generally, the hardware resembles a set of counters and registers connected together by a state machine.

SUMMARY OF THE INVENTION

The present invention is an improvement over the hard-wired implementations used in the prior art. According to the present invention, a small programmable CPU running at the video display rate, or at a submultiple of the video display rate, is used to generate the timings by loading control registers on the fly.

In a preferred embodiment, a very reduced instruction set is used to generate vertical SYNC (VSYNC), horizontal SYNC (HSYNC), and composite SYNC (CSYNC) signals. The CPU executes instructions out of an Instruction static random access memory (SRAM). The principle function implemented by the CPU is to load a pair of backing registers before a down counter reaches the value of zero.

The present invention allows more flexibility in video timing control with less hardware. Other advantages of the present invention will become evident in view of the detailed description of the preferred embodiments.

DETAILED DESCRIPTION OF THE PREFERRED EMBODIMENTS

Figure 1:
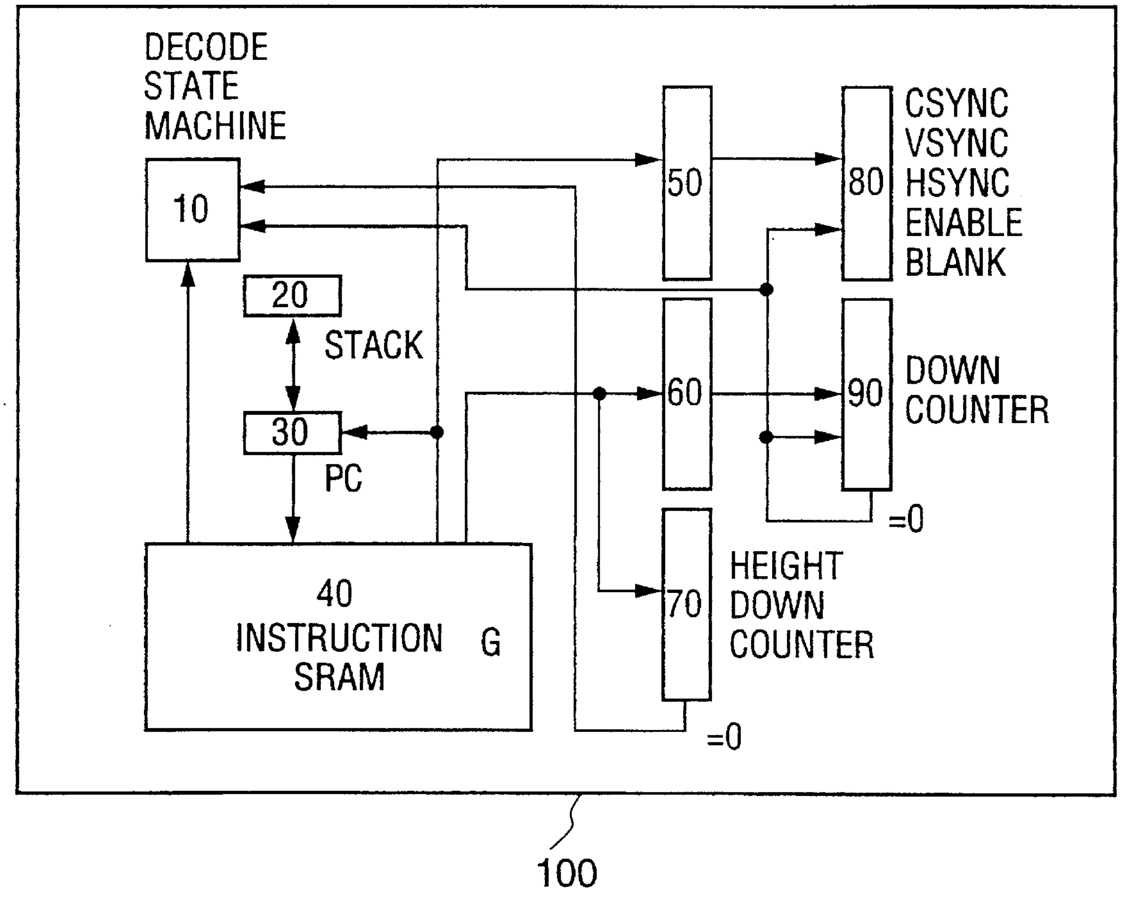
FIG. 1 is a block diagram illustrating a signal generator used to generate timing signals according to a preferred embodiment of the present invention.

A block diagram of the signal generator 100 according to the present invention is shown in FIG. 1. In the preferred embodiment shown, signal generator 100 is used to generate timing signals for video display.

As shown in FIG. 1, a down counter register 90 is clocked at a system pixel clock rate or at a submultiple thereof. Once this counter reaches zero, it reloads a new value from the pixel counter backing register 60 and at the same time copies the values in output signal backing register 50 into output signal register 80. Output signal register 80 drives the CSYNC, VSYNC and HSYNC signals, the blanking signal and the pixel clock enable signal. The pixel clock enable signal starts pixels being clocked out of the video on a First-In-First-Out (FIFO) basis.

A small controller, or CPU identified as "decode state machine" 10 in FIG. 1, is used to execute a very reduced set of instructions (e.g., four instructions) out of the Instruction SRAM 40. The goal of this CPU is to load backing registers 50 and 60 before pixel counter 90 reaches zero. The decode state machine 10 executes the instruction that is fetched from the Instruction SRAM 40 at the address in PC register 30. The four instructions that are understood by decode state machine 10 ("CPU" 10) are LOAD, CALL, CRET and CJMP.

The rate, or frequency, at which the CPU 10 operates is dictated by system requirements. Accordingly, the frequency may be equal to the video display rate of the overall system or a submultiple thereof.

The LOAD instruction loads pixel backing registers 50 and 60. The machine then pauses until the next time registers 80 and 90 are reloaded. The next instruction is fetched from the address PC+1.

The CALL instruction pushes PC+1 into the stack register 20 and jumps to the address given in the instruction. The height down counter register 70 is loaded at the same time.

In response to the CRET instruction, if height counter 70's value is zero, PC 30 is loaded with the value in the stack register 20 and height counter 70 is reloaded. Otherwise, the height counter is decremented by 1 and the PC is loaded from the instruction. This is a conditional return or jump.

In response to the CJMP instruction, if the height counter's value is zero, PC register 30 is loaded with the value PC+1 and the height counter is reloaded. Otherwise, the height counter is decremented by one and the PC is loaded from the instruction. This is a conditional jump.

For the implementation described, pixel counter 90 is 13 bits, height counter 70 is 13 bits, the PC and stack registers (30 and 20) are 5 bits each, and the instruction fields are 2 bits each.

Thus, a more flexible timing approach is provided by using a programmable CPU (decode state machine 10) instead of hardwiring a timing circuit. The set of instructions given above is provided by way of example only. Certainly, many different instructions can be used to accomplish the same goals. However, the instructions are believed to be the best way to carry out the present invention as contemplated by the inventors.

While the present invention has been described with particular reference to the preferred embodiments disclosed, one of ordinary skill in the art would be enabled by this disclosure to make various modifications to the embodiments disclosed and still be within the scope and spirit of the present invention as embodied in the appended claims.

What is claimed is:

1. A video timing signal generation circuit comprising:

a plurality of control registers; and a programmable CPU running at a particular frequency and generating timings by loading the control registers on the fly, wherein the plurality of control registers includes a down counter register, a pixel counter backing register, an output signal register and an output signal backing register.

2. The video timing signal generation circuit according to claim 1, wherein the output signal register drives CSYNC, VSYNC and HSYNC signals.

3. The video timing signal generation circuit according to claim 1, wherein the CPU executes a very reduced instruction set and ensures that the pixel counter backing register and the output signal backing register are loaded before the down counter register reaches a value of zero.

4. The video timing signal generation circuit according to claim 2, wherein the CPU executes a very reduced instruction set and ensures that the pixel counter backing register and the output signal backing register are loaded before the down counter register reaches a value of zero.

5. The video timing signal generation circuit according to claim 4, wherein the frequency at which the CPU is running is equal to a submultiple of the video display rate.

6. A video timing signal generation circuit, comprising:

a plurality of control registers; and a programmable CPU, said programmable CPU being programmed to generate timing signals in response to a very reduced set of instructions, and to load the control registers with said timing signals, wherein said very reduced set of instructions consists of four instructions.

7. The circuit of claim 6, wherein said four instructions are a LOAD instructions, a CALL instruction, a CRET instruction, and CJMP instruction.

* * * * *